(12) United States Patent
Brandwine et al.

(10) Patent No.: US 9,319,272 B1
(45) Date of Patent: Apr. 19, 2016

(54) METHODS AND APPARATUS FOR PROVIDING COMPOSED APPLIANCE SERVICES IN VIRTUALIZED PRIVATE NETWORKS

(75) Inventors: Eric J. Brandwine, Haymarket, VA (US); Ameet N. Vaswani, Seattle, WA (US); Ekechi Karl Edozie Nwokah, Palo Alto, CA (US); Eric W. Schultze, Bellevue, WA (US)

(73) Assignee: Amazon Technologies, Inc., Reno, NV (US)

(*) Notice: Subject to any disclaimer, the term of this patent is extended or adjusted under 35 U.S.C. 154(b) by 246 days.

(21) Appl. No.: 13/239,159

(22) Filed: Sep. 21, 2011

(51) Int. Cl.
  *G06F 15/173* (2006.01)
  *H04L 12/24* (2006.01)

(52) U.S. Cl.
  CPC .................................. *H04L 41/0806* (2013.01)

(58) Field of Classification Search
  CPC ..................... H04L 12/4641; H04L 29/06612; H04L 63/0272; H04L 41/0806
  USPC .......................................................... 709/224
  See application file for complete search history.

(56) References Cited

U.S. PATENT DOCUMENTS

| | | | |
|---|---|---|---|
| 6,240,402 B1* | 5/2001 | Lynch-Aird | 705/400 |
| 7,325,140 B2* | 1/2008 | Carley | 713/182 |
| 7,505,962 B2* | 3/2009 | Shariff et al. | |
| 7,937,438 B1 | 5/2011 | Miller et al. | |
| 7,945,640 B1* | 5/2011 | Vantine | 709/217 |
| 7,953,865 B1 | 5/2011 | Miller et al. | |
| 7,991,859 B1 | 8/2011 | Miller et al. | |
| 8,117,289 B1 | 2/2012 | Miller et al. | |
| 8,131,852 B1 | 3/2012 | Miller et al. | |
| 8,201,237 B1 | 6/2012 | Doane et al. | |
| 8,224,971 B1 | 7/2012 | Miller et al. | |
| 8,230,050 B1 | 7/2012 | Brandwine et al. | |
| 8,239,538 B2* | 8/2012 | Zhang et al. | 709/226 |
| 8,312,129 B1 | 11/2012 | Miller et al. | |
| 8,345,692 B2* | 1/2013 | Smith | 370/396 |
| 8,352,941 B1* | 1/2013 | Protopopov et al. | 718/1 |
| 2003/0084104 A1* | 5/2003 | Salem et al. | 709/205 |
| 2005/0198244 A1* | 9/2005 | Eilam et al. | 709/223 |

(Continued)

OTHER PUBLICATIONS

Wikipedia, "Virtual Private Networks," Aug. 2008.*
U.S. Appl. No. 13/149,516, filed May 31, 2011; Jacob Gabrielson.
Amazon Web Service, "Amazon Virtual Private Cloud User Guide", API Version, Jun. 15, 2014, pp. 1-162.

(Continued)

*Primary Examiner* — Andrew Georgandellis
(74) *Attorney, Agent, or Firm* — Robert C. Kowert; Meyertons, Hood, Kivlin, Kowert & Goetzel, P.C.

(57) ABSTRACT

Methods and apparatus that enable appliance service instances to be provisioned in a subnet of a customer's private network on a service provider network without provisioning the backend nodes in the customer's subnet. At least one front-end node instance is provisioned in the customer's subnet. Instead of provisioning the backend nodes in the customer's subnet, the appliance service provider provisions the backend node instances in the appliance service provider's subnet. In addition, at least the front-end node instance may be provided with multiple interfaces. At least two of the interfaces face different subnets, with one facing the customer subnet and the other facing the backend subnet operated by the appliance service provider in which the backend node instances are implemented. In some implementations, a third interface may face a management subnet so that the owner of the front-end node instance may manage the instance.

30 Claims, 13 Drawing Sheets

(56) References Cited

U.S. PATENT DOCUMENTS

| | | | |
|---|---|---|---|
| 2010/0057831 A1* | 3/2010 | Williamson | 709/203 |
| 2010/0246443 A1 | 9/2010 | Cohn et al. | |
| 2011/0320605 A1* | 12/2011 | Kramer et al. | 709/226 |
| 2012/0084113 A1 | 4/2012 | Brandwine et al. | |
| 2012/0084443 A1 | 4/2012 | Theimer et al. | |

OTHER PUBLICATIONS

Amazon Web Service, "Amazon Elastic Compute Cloud User Guide for Linux", API Version, Jun. 15, 2014, pp. 1-685.

U.S. Appl. No. 14/542,513, filed Nov. 14, 2014, Kevin Christopher Miller.

* cited by examiner

METHODS AND APPARATUS FOR PROVIDING COMPOSED APPLIANCE SERVICES IN VIRTUALIZED PRIVATE NETWORKS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Web Services

The conventional Web model allows clients to access Web resources (e.g., applications, services, and data) via an HTTP client program, such as a Web browser. A technology referred to as Web services has been developed to provide programmatic access to Web resources. Web services may be used to provide programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some implementations, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

Figure 1:
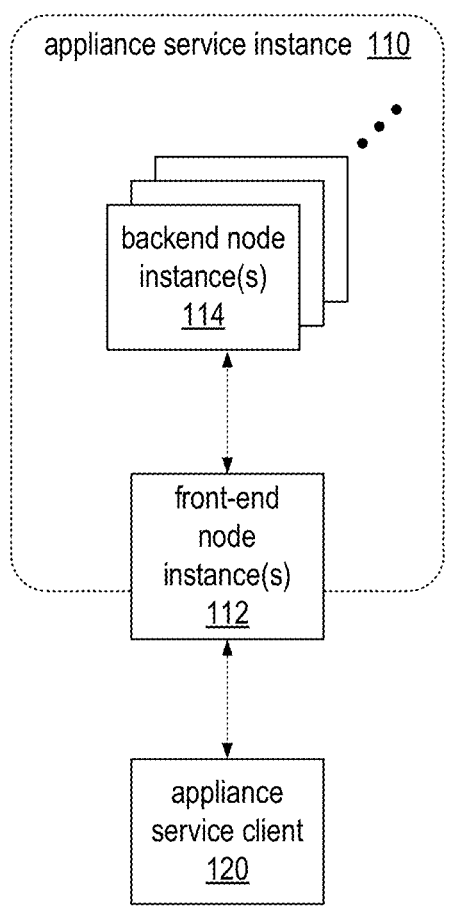
FIG. 1 broadly illustrates an example appliance service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for providing composed appliance services in virtualized private networks are described. Embodiments may, for example, be implemented in the context of a service provider that provides virtualized computing resources to multiple customers. A service provider may provide resource virtualization to the customers via one or more virtualization services that allow the customers to purchase, rent, or otherwise obtain instances of virtualized resources, including but not limited to computation and storage resources, implemented on devices within a service provider network or networks in one or more service provider data centers. The section titled Example service provider networking environments describes example service provider network environments as illustrated in FIGS. 9 through 12 in which embodiments of the methods and apparatus for composed appliance services as described herein may be implemented to provide appliance service instances in customers' private networks.

A service provider network may include subnetworks, or subnets, that each include a set of logically isolated network components. The subnets may, for example, be used to logically separate the components of virtualization services, load balancer services, appliance services, and so on from the open network. A service provider may also enable customers, including but not limited to third-party operators of various services provided on the service provider network, to create virtual private networks on the service provider network using subnets. A private network is a set of logically separated resource instances on the service provider network that are allocated to a given customer. The resource instances may be implemented on multi-tenant hardware that is shared with other customers and/or on hardware dedicated to the particular customer. A private network may include one or more subnetworks, or subnets. A private network may be, but is not necessarily, subdivided into two or more subnets, for example a public-facing subnet and a private-facing subnet. The customer may have control over network functionality of the subnet(s) in the private network, for example controlling incoming and outgoing network traffic. A private network may, for example, enable a customer to connect existing infrastructure on the customer's network to the logically isolated resource instances in the subnet(s) of the private network, and to extend management capabilities such as security services, firewalls, and intrusion detection systems to include the customer's resource instances in the subnet(s) of the private network. As another example, private networks may be used by third parties or by the service provider to provide appliance services on the service provider network. For further illustration and discussion of private networks and subnets, see FIG. 12 and the discussion thereof in the section titled Example service provider networking environments.

In at least some embodiments, a service provider may also provide, or may allow a third party to provide, load balancers on the service provider network via a load balancer service. For example, a client may launch some number of resource instances (e.g., computation resources or storage resources) in the service provider network, and instruct the load balancer service to place a load balancer in front of the resource instances. The load balancer may then distribute incoming traffic across the resource instances behind the load balancer.

A service provider may also provide and/or may allow third parties to provide appliance services to clients on the service provider network. FIG. 1 broadly illustrates an example appliance service, according to at least some embodiments. A client 120 may access or obtain an instance 110 of an appliance service from the service provider or from a third party. An appliance service instance 110 may be composed of one or more virtualized resources on the service provider network that the appliance service provider provisions on behalf of the client 120 that requests the instance 110 of the appliance service. In at least some implementations, one or more of the virtualized resources in an appliance service instance may serve as front-end or interactive node instance(s) 112 to which the client 120 communicates, and one or more others of the virtualized resources in the appliance service instance may serve as backend node instance(s) 114 to which the front-end node instance(s) 112 distribute or provide incoming traffic received from the client 120. The front-end node instance(s) 112 may, for example, be load balancers provided via a load balancer service as described above. More generally, a front-end node instance 112 of an appliance service instance 110 may be defined as a resource instance that is provisioned with at least the hardware and software necessary to support front-end or interactive operations of the respective appliance service. Similarly, a backend node instance 114 of an appliance service instance 110 may be defined as a resource instance that is provisioned with at least the hardware and software necessary to support operations of a backend node of the respective appliance service. The client 120 may not be aware that a front-end node instance 112 of the appliance service is a load balancer or other front-end component, or of the backend node instance(s) 114 behind the front-end node instance(s) 112; the client 120 may simply see an appliance service endpoint or address to which the client communicates.

Examples of appliance services that may be implemented with one or more front-end nodes and one or more backend nodes as described above may include, but are not limited to, search index virtualization services, distributed databases with query nodes, and high-performance (HPC) clusters or grids with one or more front-end nodes that distribute workload among a plurality of compute nodes. More generally, such an appliance service may be any service that uses a traffic director or similar component at the front-end, or any service that has some number of client-interactive front-end nodes and some number of backend nodes that are hidden from the customer.

An appliance service may generally be implemented in a subnet of the service provider network. For example, the service provider or a third-party provider may provide a search index service on a subnet of the service provider network. Note that a subnet of a third-party provider may generally be in a private network allocated to and operated by the third-party provider. A client may request a search domain via the search index service, and an appliance service instance composed of a load balancer as a front-end node and some number of resource instances as backend nodes may then be provisioned by the search index service on the client's behalf.

Figure 2:
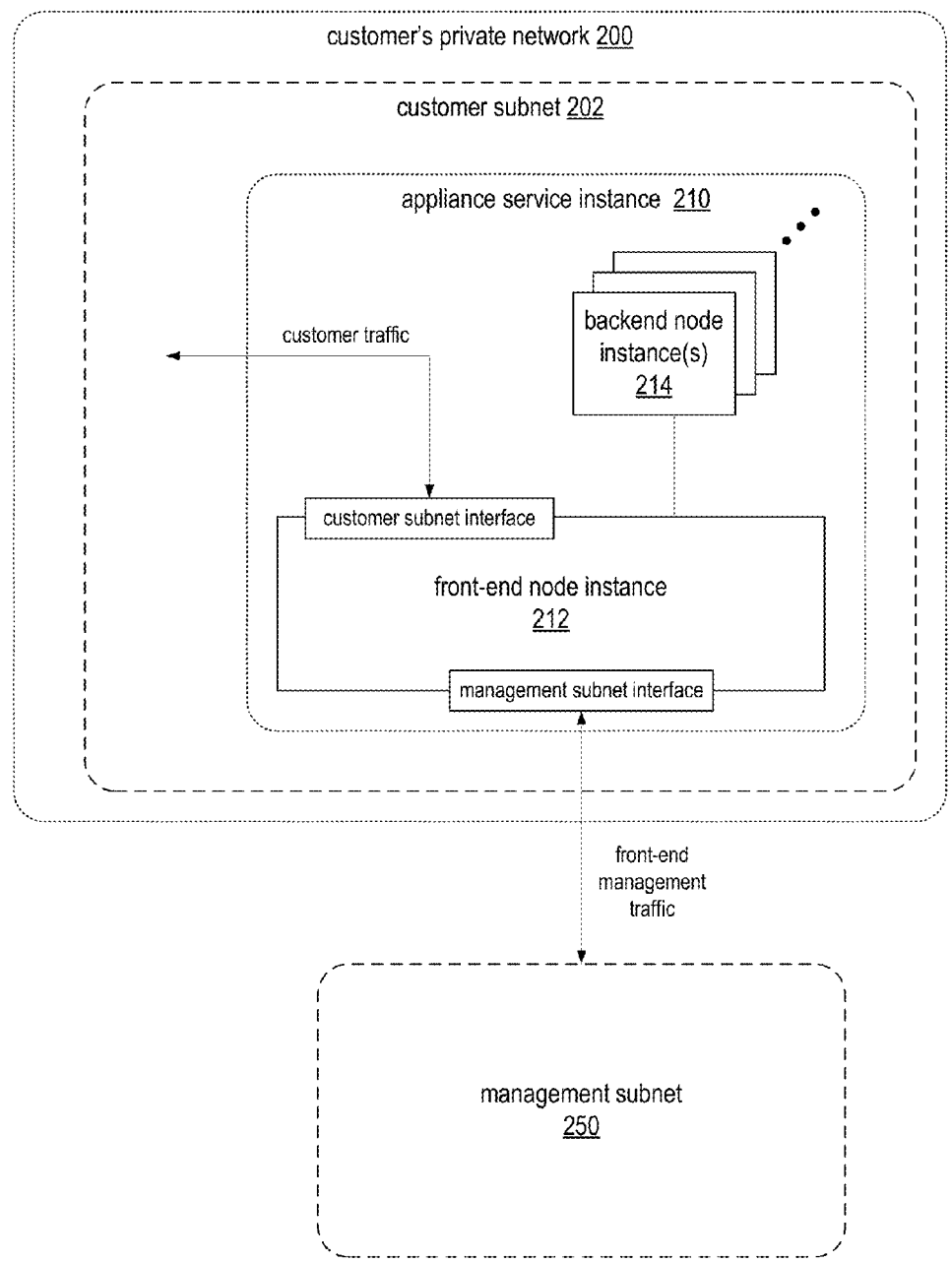
FIG. 2 illustrates an appliance service instance implemented in a customer's subnet, according to at least some embodiments.

A service provider may allow an appliance service provider to implement an appliance service instance within a subnet of a customer's private network on the service provider network. FIG. 2 illustrates an appliance service instance 210 implemented in a subnet 202 on a customer's private network 200, according to at least some embodiments. The appliance service provider may desire or require access to the resource instances in the appliance service instance 210 to manage the resource instances 212 and 214 in the appliance service instance 210, for example to receive operational or usage metrics for billing purposes, for health/performance monitoring, and/or to access the resource instances 212 and 214 in response to customer complaints about performance. However, as noted above, the customer may have complete control over the customer subnet(s) (e.g., subnet 202) on the customer's private network 200, for example to control incoming and outgoing network traffic to the subnet(s). Thus, it is possible that a customer may purposefully or inadvertently block or interfere with at least some desired or required access of the appliance service instance 210 by the appliance service provider. For example, a customer might disallow outgoing usage metrics traffic from the appliance service instance 210 in an attempt to avoid usage fees.

To avoid this problem, resource instances in an appliance service instance 210 may be provisioned with two separate interfaces—one interface in the customer subnet 202 for customer-side interactive access to the appliance service instance 210 (which may be referred to as a customer subnet interface), and the other interface in a subnet 250 operated by the appliance service provider that allows the provider access to the resource instances for monitoring and management purposes (which may be referred to as a management subnet interface). The application service provider effectively controls the management subnet interface, and thus the customer cannot purposefully or inadvertently interfere with the incoming and outgoing management traffic. While FIG. 2 shows these two interfaces only for the front-end node instance 212, note that each backend node instance 214 may also be configured with at least two interfaces, one on the customer subnet 202 for communicating with the front-end node instance 212, and one on the management subnet 250 or on a different subnet for monitoring and managing operations of the backend node instance 214 from the management subnet 250 or from the different subnet. Also note that, while FIG. 2 shows management subnet 250 outside of the customer's private network 200, in some implementations management subnet 250 may be another subnet of the customer's private network 200.

Providing two separate interfaces on resource instances as illustrated in FIG. 2 works well when the customer controls and operates the back-end nodes served by a front-end node. The load balancer service previously described is an example. A customer may launch some number of resource instances in a subnet of the customer's private network, and instruct the load balancer service to place a load balancer in front of the resource instances in the subnet. The customer may then access the load balancer instance via the customer subnet interface, and the load balancer service provider may access the load balancer instance via the management subnet interface. Note that, in this example, the customer expects to see all of the resource instances (both the load balancer and the resource instances being load-balanced) in the customer's subnet.

However, as previously noted, an appliance service instance may be composed of one or more front-end or interactive node(s) to which the customer communicates, and one or more backend node(s) to which the front-end node(s) distribute or provide incoming traffic received from the customer; the nodes may all be provisioned by the appliance service on behalf of the customer. Furthermore, the front-end node(s) may be provided by one entity, and the backend node(s) may be provided by another entity. For example, referring to FIG. 2, the front-end node instance(s) 212 may be load balancers provided via a load balancer service, while the backend node instance(s) 214 may be provided by the appliance service itself. The customer does not directly launch the resource instances 214 for the backend nodes; instead, the customer requests the appliance service provider to implement an appliance service instance 210 on a subnet 202 in the customer's private network 200, for example via an applications programming interface (API) to the appliance service provider. The appliance service provider launches the resource instance(s) 212 for the front-end node(s) in the customer's subnet, for example via an API to a load balancer service provided by the service provider or some other entity, and also launches the resource instance(s) 214 for the back-end node(s) in the customer's subnet 202. For example, if the appliance service is a search index service, the customer may request a search domain, and a load balancer and some number of search backend nodes may be provisioned by the search index service in the customer's subnet 202 on the customer's behalf. To provision the load balancer, the search index service may communicate with a separate load balancer service, for example via an API to the load balancer service, which may be but is not necessarily provided by the service provider.

While the above works, the customer may not be aware, and generally may not care, how the appliance service is implemented. Specifically, the customer may not be aware that the appliance service instance 210 is implemented as multiple backend node instances(s) 214 and one or more front-end node instance(s) 212 such as load balancers that front the backend node instances(s) 214. The customer may simply expect to see an "appliance service" instance appear on the customer's subnet 202 with which the customer communicates. However, using this technique, the customer would instead see the front-end node instance(s) 212 as well as multiple backend node instances 214 appear on the customer's subnet 202. Furthermore, the appliance service instance 210 may be scalable—that is, the appliance service instance 210 may add or remove node instances based on demand. However, the appearance and coming and going of all of these node instances on the customer's subnet 202 might be confusing to the customer.

In addition, the multiple node instances may use up IP addresses allocated to the customer for use on the customer's private network. In addition, both management and data traffic for all of the node instances in the appliance service instance 210 would traverse at least part of the customer's private network.

Methods and apparatus are described that enable appliance service instances to be provisioned in a subnet of a customer's private network on the service provider network without provisioning the backend nodes in the customer's subnet. In embodiments, instead of provisioning the backend nodes in the customer's subnet, the appliance service provider provisions the backend nodes in the appliance service provider's subnet, as shown in FIGS. 3 through 6. In addition, resource instances in an appliance service instance may be provided with two, three, or more network interfaces that may each logically reside in different subnets, as illustrated in FIGS. 3 through 6 and described below.

Figure 3:
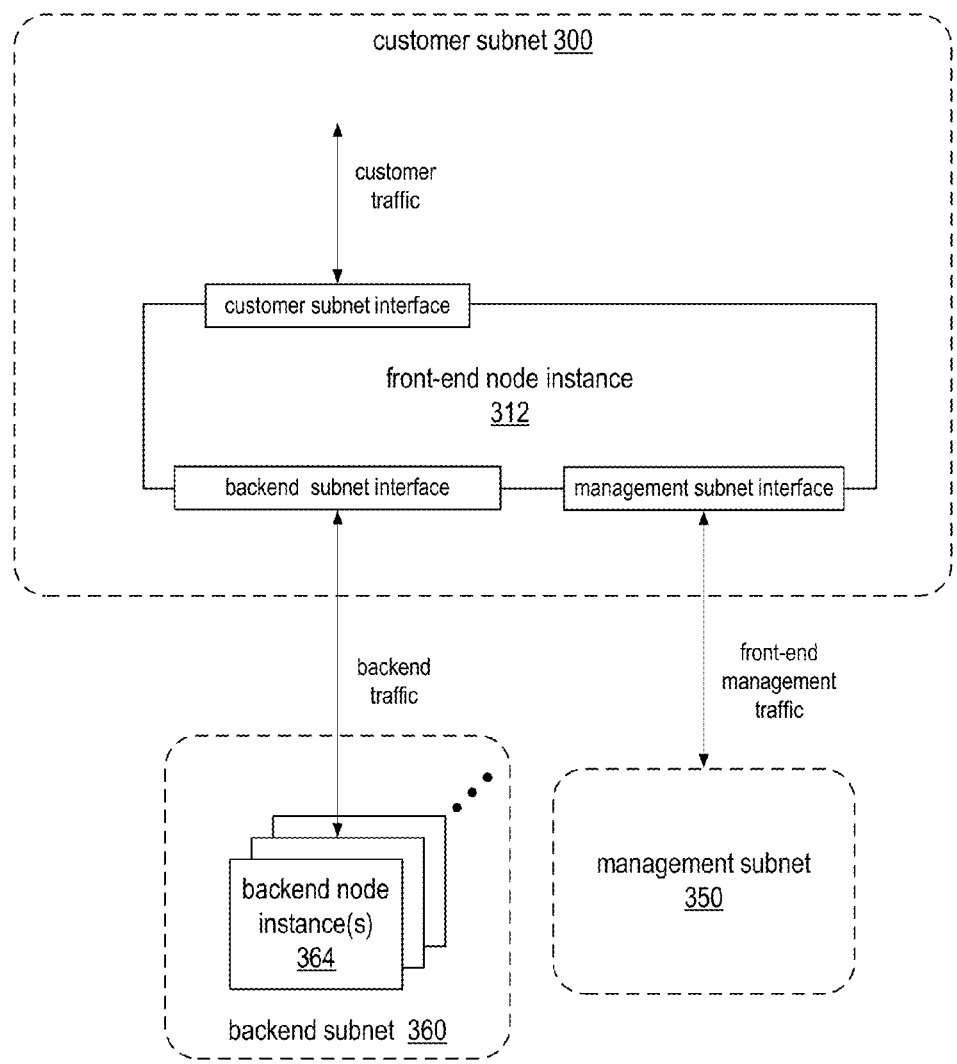
FIG. 3 illustrates an example composed appliance service instance in which at least the front-end node instance includes three interfaces, and in which the back-end node instances are implemented in a separate subnet, according to at least some embodiments.

FIG. 3 illustrates an example composed appliance service instance in which at least the front-end node instance includes three interfaces, and in which the back-end node instances are implemented in a separate subnet, according to at least some embodiments. As shown in FIG. 3, the front-end node instance 312 may be implemented in the customer subnet 300, while the backend node instances 364 may be implemented in a separate subnet 364 operated by the appliance service provider. In at least some embodiments, for example to support appliance services where the front-end provider and the backend provider are different entities, at least some resource instance(s) in an appliance service instance may each be provisioned with three separate interfaces, as shown by the front-end node instance 312 in FIG. 3. A first interface (referred to as the customer subnet interface) is in the customer subnet 300 for customer-side access to the appliance service instance. A second interface (referred to as the management subnet interface) is in a subnet 350 operated by the front-end provider that enables access to the front-end node instance 312 on the customer subnet 300. The management subnet interface enables access to the front-end node instance 312 for various monitoring and management purposes. A third interface is in a separate, third subnet 360 operated by the provider of the backend node instance(s) 364 (i.e., the appliance service provider). The third subnet 360 may be referred to as a backend subnet 360, and the third interface may be referred to as the backend subnet interface. Communications between the front-end node instance 312 and the backend node instances 364 is performed via the backend subnet interface.

Using embodiments as illustrated in FIG. 3, the customer only sees the front-end node instance(s) 312 on the customer subnet 300. In addition, IP addresses are consumed on the backend subnet 360 instead of the customer subnet 300. Furthermore, monitoring and management of the backend node instances 364 may be performed on the backend subnet 360, for example via multiple interfaces on the backend node instance(s) 364, thus avoiding at least some management traffic on the customer network 300.

Referring to FIG. 3, in some implementations, the customer subnet 300, management subnet 350, and backend subnet 360 may each be implemented as subnets of different private networks on the service provider network. This may be the case, for example, if different entities provide the front-end node instances and backend node instances of the appliance service. However, in other implementations, any two or all three of the subnets may be subnets of the same private network on the service provider network. For example, a customer may want to implement an internal appliance service on the customer's private network, while partitioning the front-end, backend, and monitoring and management components of an instance of the appliance service into different subnets of the customer's private network.

Figure 4:
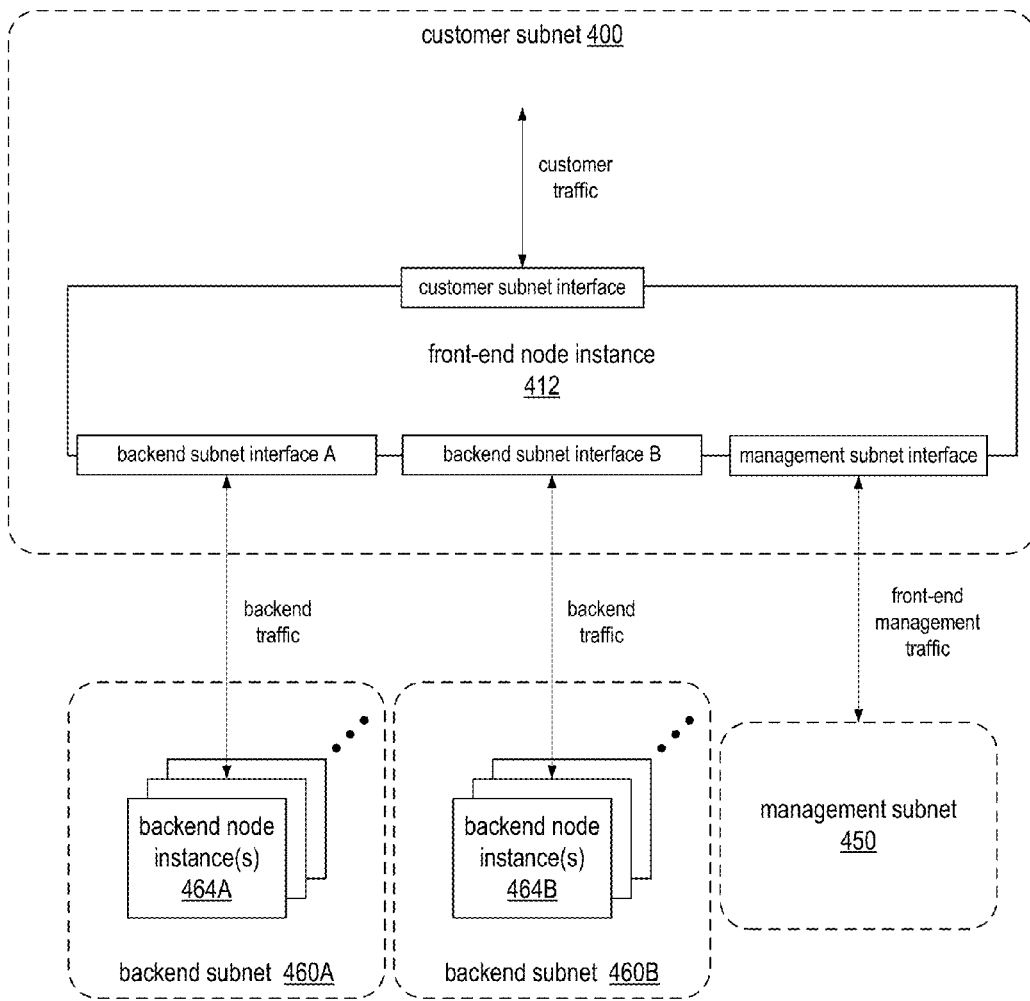
FIG. 4 illustrates an example composed appliance service instance in which at least the front-end node instance includes more than three interfaces, and in which the back-end node instances are implemented in a separate subnet, according to at least some embodiments.

FIG. 4 illustrates an example composed appliance service instance in which at least the front-end node instance includes more than three interfaces, and in which the back-end node instances are implemented in a separate subnet, according to at least some embodiments. Some appliances services may be implemented with more than one backend, and thus more than one set of backend node instances. For example, a search index service may need to query more than one fleet of backend nodes. Thus, in at least some embodiments as illustrated in FIG. 4, at least some resource instances in an appliance service instance may each be provisioned with more than three separate interfaces. For example, in these embodiments, in addition to a customer subnet interface that faces the customer subnet 400 and a management subnet interface that faces the management subnet 450 and via which the front-end provider may monitor and manage operations of the front-end node instance 412, the front-end node instance 412 may include two, three or more backend interfaces (e.g., backend subnet interfaces A and B), which each may be in a different one of two or more backend subnets (e.g., subnets 460A and 460B) on the service provider network. Each of the backend subnets 460 includes respective backend node instances (e.g., backend node instances 464A in backend subnet 460A and backend node instances 464B in backend subnet 460B). Note that the backend subnets 460 may be operated by the same entity or by different entities.

Figure 5:
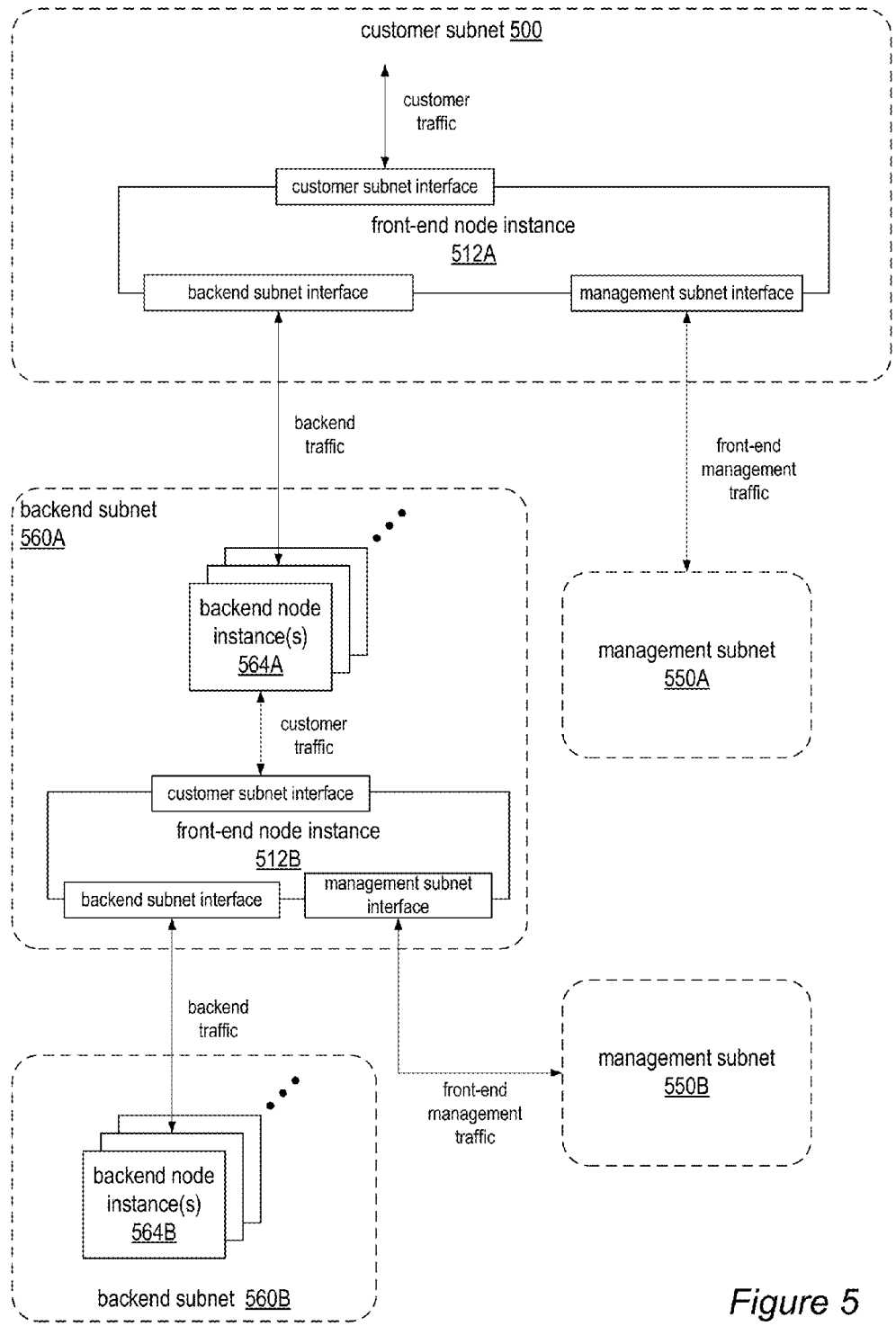
FIG. 5 illustrates an example composed appliance service in which the back-end node instances implemented in a separate subnet use another appliance service, according to at least some embodiments.

FIG. 5 illustrates an example composed appliance service in which the back-end node instances implemented in a separate subnet use another appliance service, according to at least some embodiments. Some appliances services may be implemented such that the backend node instances 564A provided by the appliance service may use another appliance service. In these implementations, using implementations of resource instances that include three or more interfaces as described above, an instance of a first appliance service may be implemented, with the front-end node instance 512A of the first appliance service instance in the customer subnet 500, and the backend node instances 564A in the backend subnet 560A of the first appliance service. The customer of the first appliance service communicate with the first appliance service instance via the customer subnet interface of the first appliance service's front-end node instance 512A, and the first appliance service's front-end node instance 512A may be monitored and managed by a front-end provider that operates management subnet 550A via the management subnet interface of front-end node instance 512A.

An instance of a second appliance service may be instantiated in the backend subnet 560A of the first appliance service. Using implementations of resource instances that include three or more interfaces as described above, the front-end node instance(s) 512B of the second appliance service may be provisioned in the backend subnet 560B of the first appliance service, while the backend node instances 512B of the second appliance service may be provisioned in the back-end subnet 560B of the second appliance service. The backend node instances 564A of the first appliance service communicate with the second appliance service via the customer subnet interface of the second appliance service's front-end node instance 512B, and the second appliance service's front-end node instance 512B may be monitored and managed by another front-end provider that operates management subnet 550B via the management subnet interface of front-end node instance 512B. The second appliance service's front-end node instance 512B communicates with the second appliance service's backend node instances 564B via the backend subnet interface of the front-end node instance 512B. Note that, while FIG. 5 shows that front-end node instances 512A and 512B are monitored and managed from different management subnets 550A and 550B, in some implementations front-end node instances 512A and 512B may be monitored and managed from the same management subnet 550. For example, a load balancer service may provide and manage load balancer front-end node instances for both customer subnet 500 and backend subnet 560A, and may control both from one management subnet 550.

Note that backend node instances 564B of the second appliance service instances may themselves use yet another appliance service, and thus backend subnet 560B may include an instance of the other appliance service front-end node similar to the backend subnet 560A. In addition, note that in the appliance service implementation as shown in FIG. 4, one or more of the appliance services that operate backend subnets 460 may be implemented similarly to the second appliance service shown in FIG. 5; in other words, the backed instances 464 may use yet another appliance service.

Figure 6:
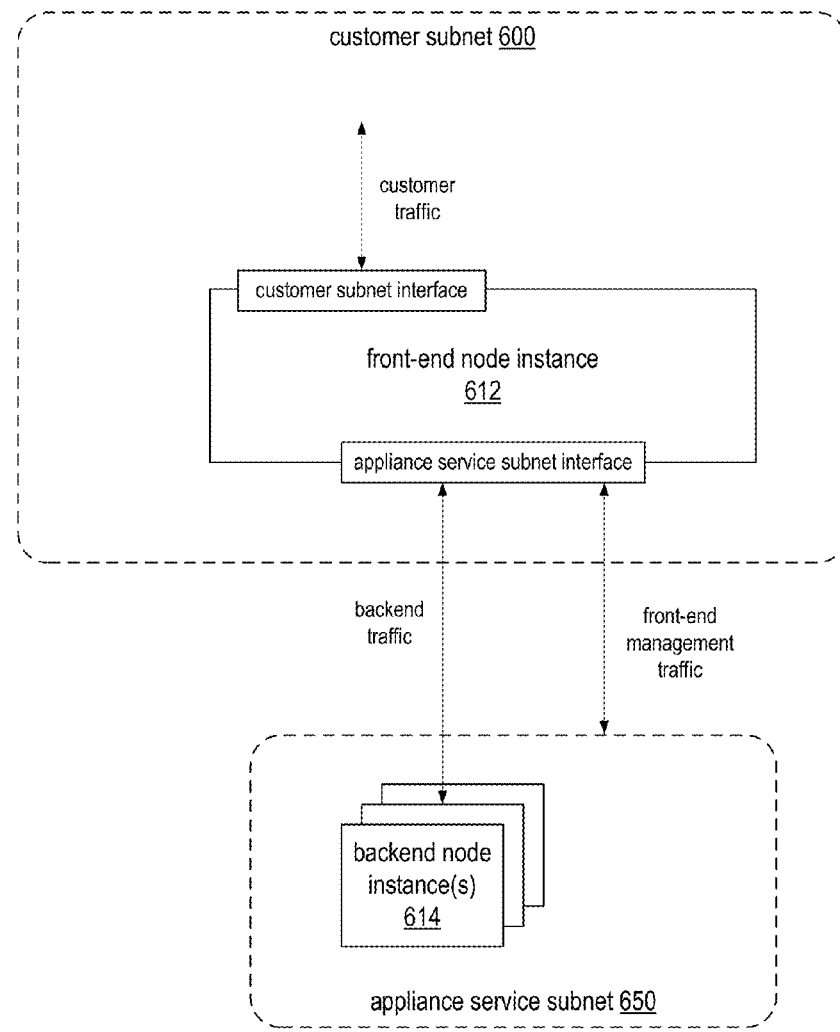
FIG. 6 illustrates an example composed appliance service in which the appliance service provider controls both the front-end node instances and the backend node instances of the appliance service instance, in at least some embodiments.

FIG. 6 illustrates an example composed appliance service in which the appliance service provider controls both the front-end node instances and the backend node instances of the appliance service instance, in at least some embodiments.

In at least some embodiments, to support appliance services where the front-end provider and the backend provider are the same entity (i.e., the appliance service provider controls both the front-end node instances and the backend node instances), the resource instances in an appliance service instance may be provisioned with two interfaces similar to the resource instances described above in relation to FIG. 2. Alternatively, the resource instances may be provisioned with more than two interfaces, while only two are used. As previously noted, the appliance service provider provisions the backend node instances 614 in the appliance service provider's subnet 650, while the front-end node instance(s) 612 are provisioned in the customer subnet 600. A first interface of a front-end node instance 612 is in the customer subnet 600 for customer-side access to the appliance service instance (the customer subnet interface); the second interface is in a subnet 650 operated by the appliance service provider (this interface may be referred to as the appliance service subnet interface). The appliance service subnet interface both enables access to the front-end node instance 612 on the customer subnet 600 for monitoring and management purposes and handles traffic between the front-end node instance 612 and the backend node instances 614 on the appliance service subnet 650.

Note that, in some applicant service implementations, the backend node instances 614 as shown in FIG. 6 may use another appliance service. Thus, at least some embodiments may allow appliance service instances as illustrated in FIG. 6 to be "chained" similar to how the appliance service instances are illustrated in FIG. 5.

Figure 7:
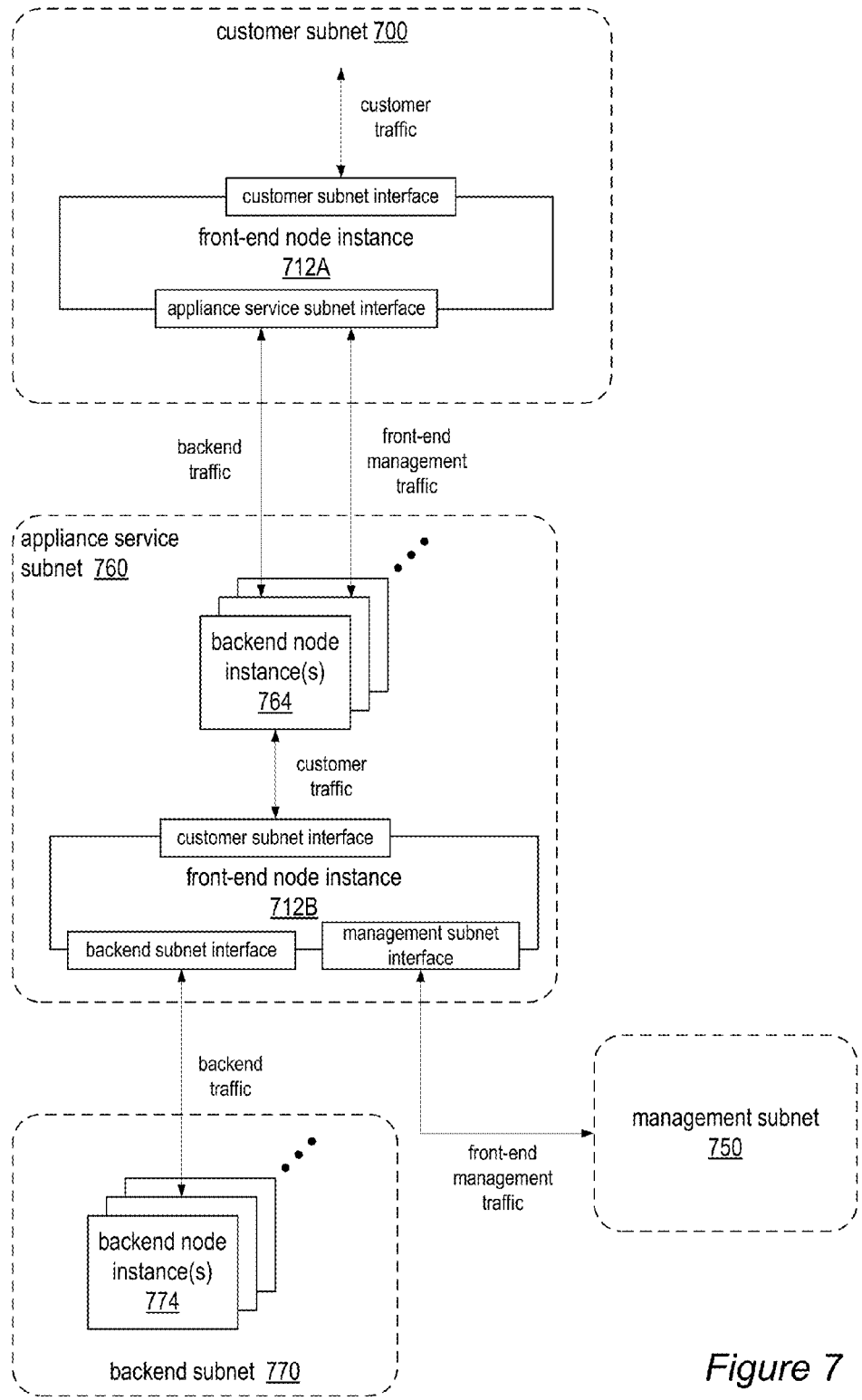
FIG. 7 illustrates an example appliance service implementation in which the backend node instances implemented on the appliance service subnet of a first appliance service implemented as shown in FIG. 6 use a second appliance service implemented similar to the appliance service shown in FIG. 3.

FIGS. 3 through 6 illustrate several example composed appliance service implementations. Particularly, FIG. 3 shows a composed appliance service instance in which three interfaces are used on at least the front-end node instance, FIG. 4 shows a composed appliance service instance in which more than three interfaces are used on at least the front-end node instance, and FIG. 6 shows a composed appliance service instance in which only two interfaces are used on at least the front-end node instance. In various embodiments, a service provider network may support the implementation of appliance services according to one, two, or more of these configurations. Thus, in at least some embodiments, different appliance service instances may be implemented according to any of the illustrated techniques. Furthermore, at least some embodiments may allow appliance service instances implemented according to different ones of the illustrated techniques to be chained together similar to how the appliance service instances are illustrated in FIG. 5. For example, FIG. 7 illustrates an example appliance service implementation in which the backend node instances 764 implemented on the appliance service subnet 760 of a first appliance service implemented as shown in FIG. 6 use a second appliance service implemented similar to the appliance service shown in FIG. 3. The first appliance service controls both its front-end node instance 712A on customer subnet 700 and its backend node instances 764. Both front-end monitoring and management traffic and backend traffic flow through the appliance service subnet interface of the front-end node instance 712A. Thus, the front-end node instance 712A in this example may only implement two interfaces. The second appliance service controls its backend node instances 774 on backend subnet 770, but does not control the front-end node instance 712B on appliance service subnet 760. The front-end node instance 712B is monitored and managed from management subnet 750 via the management subnet interface, and backend traffic passes between front-end node instance 712B and backend node instances 774 via the backend subnet interface of front-end node instance 712B.

Figure 8:
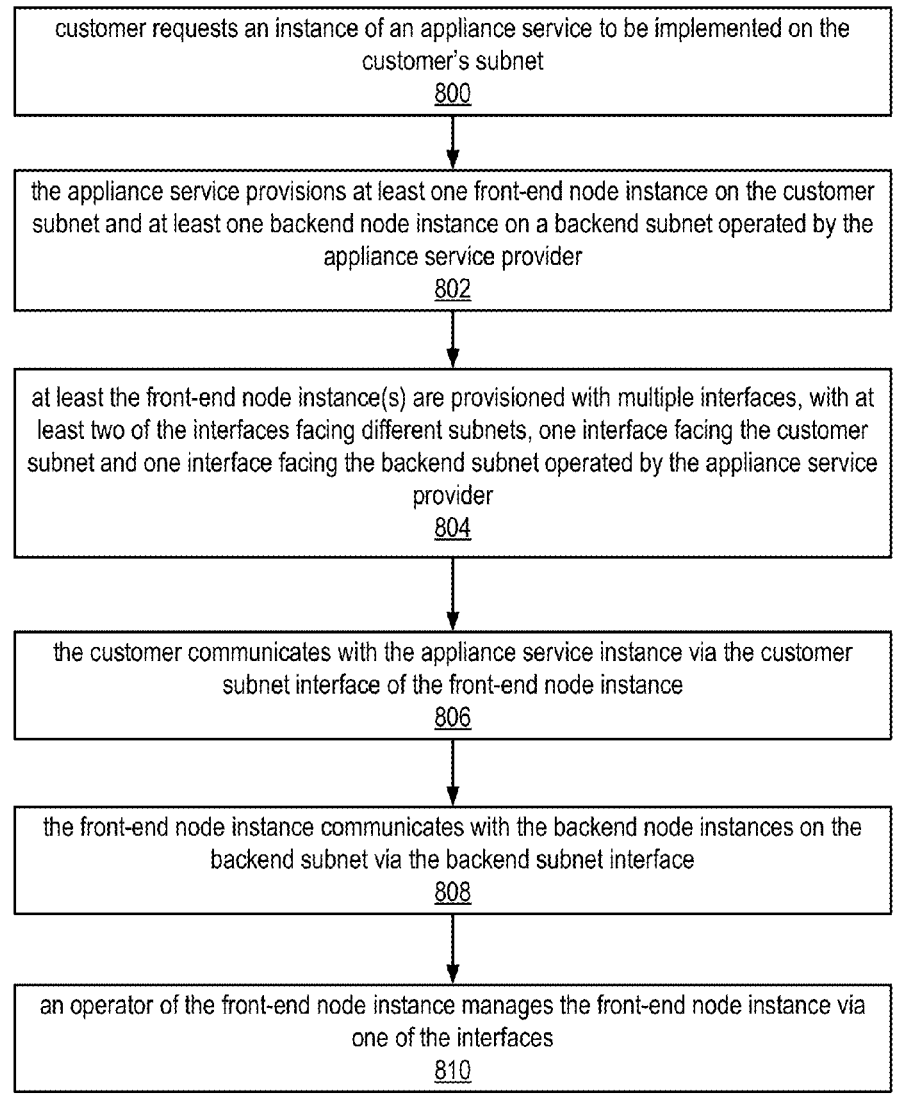
FIG. 8 is a flowchart of a method for providing composed appliance services in virtualized private networks on a service provider network, according to at least some embodiments.

FIG. 8 is a flowchart of a method for providing composed appliance services in virtualized private networks on a service provider network, according to at least some embodiments. As indicated at 800 a customer requests an instance of an appliance service to be implemented on a subnet of the customer's private network, for example via a call to an API to the appliance service. As indicated at 802, the appliance service provisions at least one front-end node instance on the customer subnet and at least one backend node instance on a backend subnet operated by the appliance service provider. The front-end node instance may be, but is not necessarily, provisioned by a third party, for example a load balancing service. In at least some embodiments, the appliance service may request provisioning of the front-end node instance via an API call to an entity that provides the front-end node instance. The backend node instances may be provisioned by the appliance service provider. However, in some cases, the backend node instances may be provisioned by a third party, for example via an API call. As indicated at 804, at least the front-end node instance(s) may be provisioned with multiple (two, three, or more) interfaces. At least two of the interfaces of each front-end node instance face different subnets, with one of the interfaces facing the customer subnet and the other interface facing the backend subnet operated by the appliance service provider in which the backend node instances are implemented. As indicated at 806, the customer communicates with the appliance service instance via the customer subnet interface of the front-end node instance. As indicated at 808, the front-end node instance communicates with the backend node instances on the backend subnet via the backend subnet interface. Note that there may be more than one backend subnet, and thus one or more other backend subnet interfaces may be provided on the front-end node instance to face these other backend subnets. As indicated at 810, in at least some implementations, an operator of the front-end node instance may monitor and manage the front-end node instance via one of the interfaces, for example to collect metrics for billing or other purposes, to monitor performance, to troubleshoot problems, and so on. If the appliance service provider controls and operates both the front-end node instance and the backend node instances, the monitoring and management may be performed through the same interface that the backend traffic flows over. However, if the appliance service provider controls the backend node instances and some other entity controls and operates the front-end node instance, the front-end node instance may be monitored and managed from a separate (management) subnet via a separate management subnet interface that faces the management subnet.

In at least some embodiments, the backend node instance(s) may also be provisioned with at least two interfaces. In at least some embodiments, at least two of the interfaces of each backend node instance may face different subnets, with one of the interfaces facing the backend subnet for communicating with a front-end node instance on the customer's subnet and the other interface facing a management subnet operated by an entity that provides the backend node instances for use in managing and monitoring the backend node instance.

Interfaces

The interfaces that are provisioned on resource instances as shown in FIGS. 2 through 7 may be any of various types of interface that are capable of receiving and/or transmitting packets via a network or networks. One of ordinary skill in the art will recognize that any of various hardware and/or software may be used in implementing such interfaces.

Provisioning Resource Instances and Interfaces

As previously described, a customer may request an instance of an appliance service instance, for example via an API provided by an appliance service provider. The appliance service provider may provision the resource instances for the appliance service instances, and/or may request a third party (e.g., a third party that provides the front-end node instances used in the appliance service instance) to provision one or more resource instances. The third party may be the entity that provides the service provider network, or may be some other entity with a presence on the service provider network.

Figure 11:
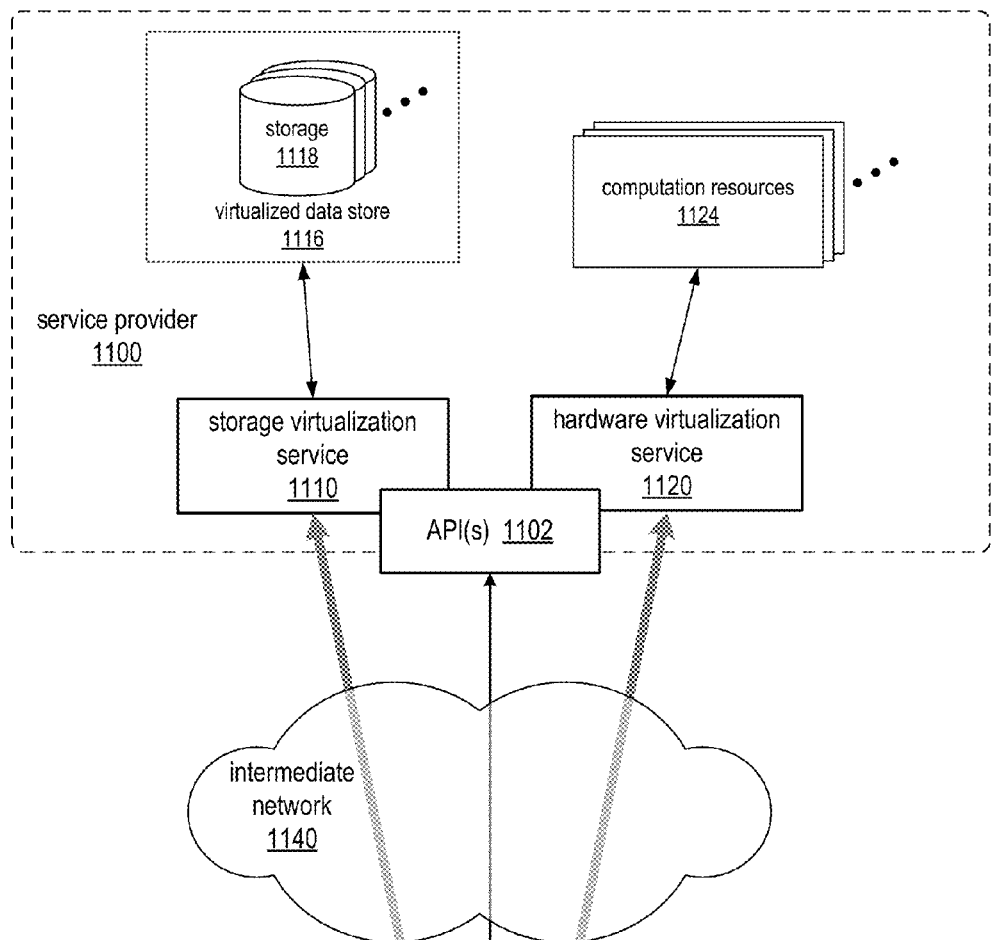
FIG. 11 is a block diagram of an example service provider that provides a storage virtualization service and a hardware virtualization service to customers, according to at least some embodiments.
Figure 11:
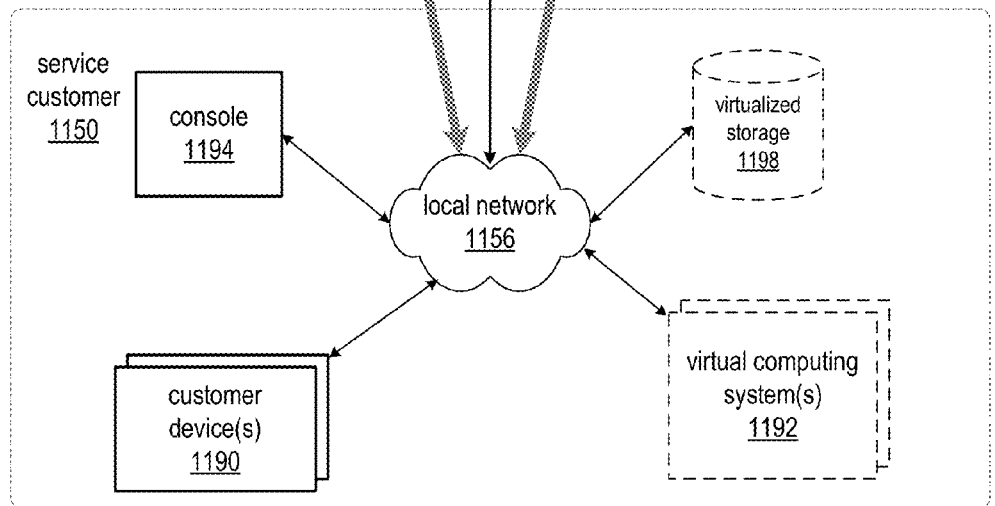

In at least some embodiments, the actual request for the allocation and provisioning of a resource instance to implement a front-end or backend node in a subnet may be made to a service provided by the entity that owns the service provider network, for example by a call to an API of a virtualization service provided by the service provider network (see, e.g., FIG. 11). The request to the service may specify the number of interfaces (e.g., two, three, or more) with which the resource instance is to be provisioned, and may also specify which subnet(s) on the service provider network the interfaces are to face. The request to the service for a resource instance may also specify other configuration requirements for the resource instance.

Service and Usage Charges

In at least some implementations, the various entities that are involved in providing appliance resource instances may charge for their services, and/or for usage of their products. For example, the operator of the service provider network may charge usage or other fees for resource instances. As another example, an appliance service provider may charge usage or other fees to customers that implement instances of the appliance service. One of ordinary skill in the art will recognize that there are many different models via which these charges may be applied. A few examples are given below.

In one example model, the appliance service provider may collect usage fees from a customer for usage of an appliance service instance. For example, the monitoring and metering methods described herein may be applied to the application service instance, and used to calculate per-time-period charges that are billed to the customer. In turn, the operator of the service provider network may charge the appliance service provider usage fees for the resource instances in the appliance service instance. If a third party is involved, for example a third party that provides the front-end node instances, the third party may charge the appliance service provider usage fees for the third party's component(s). In turn, the operator of the service provider network may charge the third party usage fees for resource instance(s) used to implement the third party's component(s).

In another example model, the operator of the service provider network may bill the customer usage fees for the customer's resources in the customer's private network. Fees for usage of the appliance service instance may be included in these charges. The operator may then pay the appliance service provider some amount on behalf of the customer. Note that the operator may also bill the appliance service provider for its own usage fees, e.g. usage fees for resource instances in the appliance service provider's private network.

Note that the above models are given as examples, and are not intended to be limiting.

Example Service Provider Networking Environments

This section describes example service provider network environments in which the above-described embodiments of the methods and apparatus for composed appliance services may be implemented to provide appliance service instances in customers' private networks. However, these example service provider network environments are not intended to be limiting.

Figure 9:
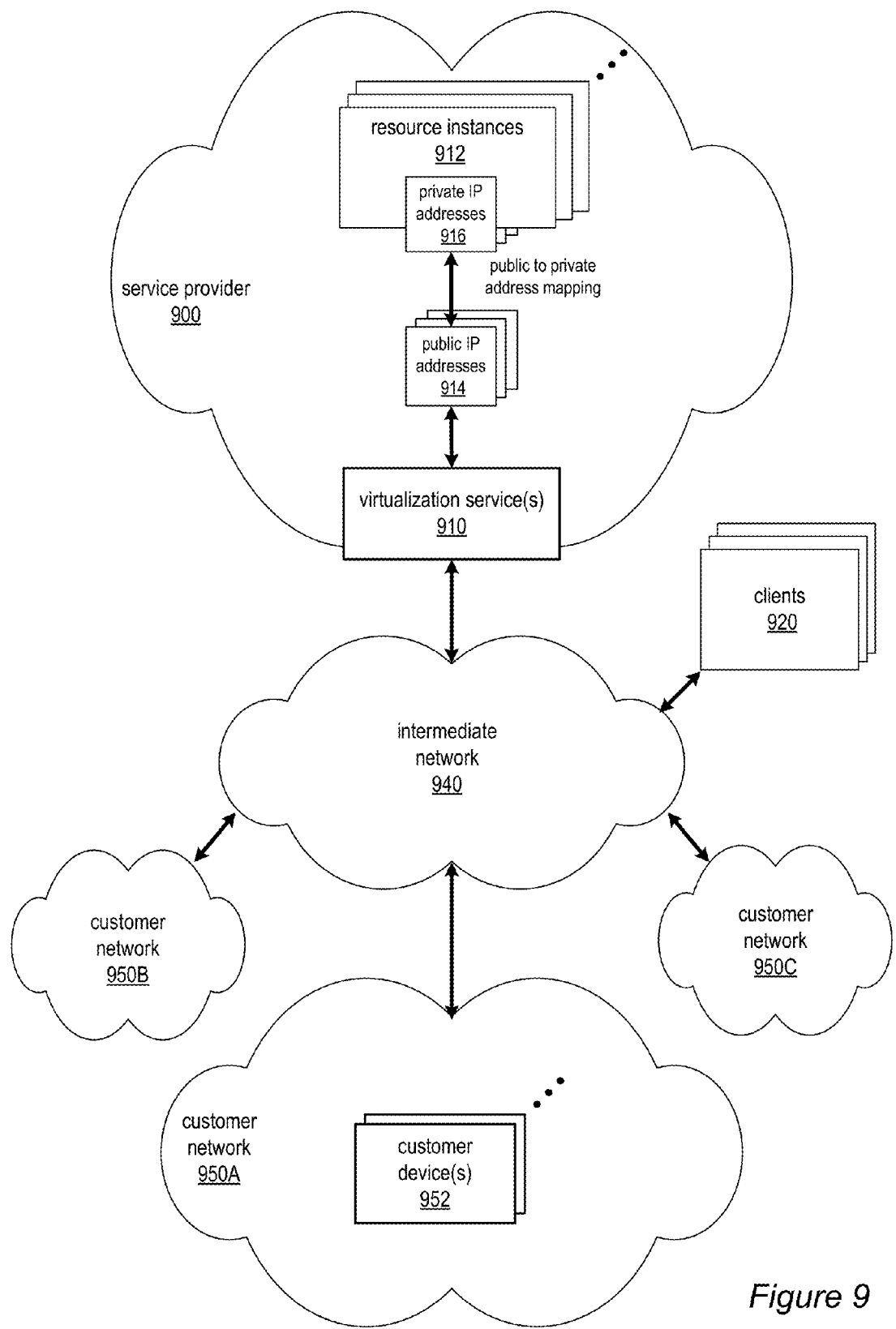
FIG. 9 illustrates an example service provider networking environment, according to at least some embodiments.

FIG. 9 illustrates an example service provider networking environment, according to at least some embodiments. A service provider 900 may provide resource virtualization to customers via one or more virtualization services 910 that allow customers 950 to purchase, rent, or otherwise obtain instances 912 of virtualized resources, including but not limited to computation and storage resources, implemented on devices within a service provider network or networks in one or more service provider data centers. Private IP addresses 916 may be associated with the resource instances 912; the private IP addresses are the internal network addresses of the resource instances 912 on the service provider 900 network. In some embodiments, the service provider 900 may also provide public IP addresses 914 and/or public IP address ranges (e.g., Internet Protocol version 4 (IPv4) or Internet Protocol version 6 (IPv6) addresses) that customers 950 may obtain from the provider 900.

Conventionally, the service provider 900, via the virtualization services 910, may allow a customer (e.g., customer 950A) to dynamically associate at least some public IP addresses 914 assigned or allocated to the customer with particular resource instances 912 assigned to the customer. The service provider 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider 900, a customer 950A may, for example, implement customer-specific applications and present the customer's applications on an intermediate network 940, such as the Internet. A client 920 on the intermediate network 940 may then generate traffic to a destination public IP address 914 published by the customer 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source client 920.

Private IP addresses, as used herein, refer to the internal network addresses of resource instances in a service provider network. Private IP addresses are only routable within the service provider network. Network traffic originating outside the service provider network is not directly routed to private IP addresses; instead, the traffic uses public IP addresses that are mapped to the resource instances. The service provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the customer. Traffic routed to a public IP address is translated, for example via 1:1 network address translation (NAT), and forwarded to the respective private IP address of a resource instance.

Some public IP addresses may be assigned by the service provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by customers of the service provider; a customer may then assign their allocated public IP addresses to particular resource instances allocated to the customer. These public IP addresses may be referred to as customer public IP addresses, or simply customer IP addresses. Instead of being assigned by the service provider network to resource instances as in the case of standard IP addresses, customer IP addresses may be assigned to resource instances by the customers, for example via an API provided by the service provider. Unlike standard IP addresses, customer IP Addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
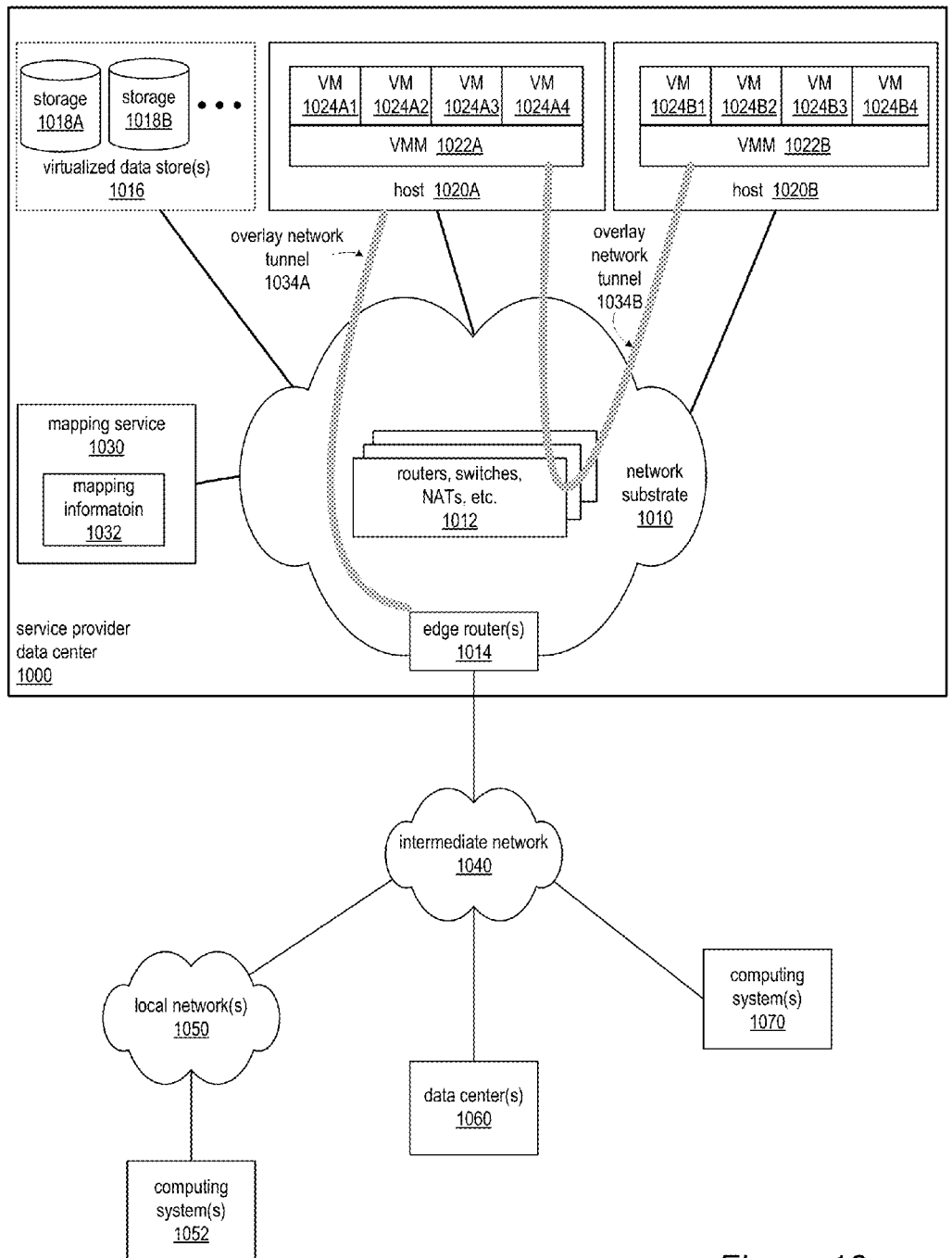
FIG. 10 illustrates an example service provider data center that implements an overlay network on a network substrate using IP tunneling technology, according to some embodiments.

FIG. 10 illustrates an example service provider data center that implements an overlay network on a network substrate using IP tunneling technology, according to some embodiments. A service provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 10) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology; the interfaces (e.g., service APIs) that are presented to customers are attached to the overlay network so that when a customer provides an IP address to which the customer wants to send packets, the IP address is run in virtual space by communicating with a mapping service (e.g., mapping service 1030) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 10, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 10, at least some networks in which embodiments may be implemented may include hardware virtualization technology that enables multiple operating systems to run concurrently on a host computer (e.g., hosts 1020A and 1020B of FIG. 10), i.e. as virtual machines (VMs) 1024 on the hosts 1020. The VMs 1024 may, for example, be rented or leased to customers of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the service provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 10 shows an example service provider data center 1000 implementing a network that provides resource virtualization technology and that provides full Internet access via edge router(s) 1014 that connect to Internet transit providers, according to at least some embodiments. The service provider data center 1000 may, for example, provide customers the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The service provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to customers of the network provider, the hardware virtualization technology may also be used to provide other computing resources, for example storage resources 1018, as virtualized resources to customers of a network provider in a similar manner.

FIG. 11 is a block diagram of an example service provider that provides a storage virtualization service and a hardware virtualization service to customers, according to at least some embodiments. Hardware virtualization service 1120 provides multiple computation resources 1124 (e.g., VMs) to customers. The computation resources 1124 may, for example, be rented or leased to customers of the service provider 1100 (e.g., to service customer 1150). Each computation resource 1124 may be provided with one or more private IP addresses. A local network of service provider 1100 may be configured to route packets from the private IP addresses of the computation resources 1124 to public Internet destinations, and from public Internet sources to the computation resources 1124.

Service provider 1100 may provide a service customer 1150, for example coupled to intermediate network 1140 via local network 1156, the ability to implement virtual computing systems 1192 via hardware virtualization service 1120 coupled to intermediate network 1140 and to the local network of service provider 1100. In some embodiments, hardware virtualization service 1120 may provide one or more APIs 1102, for example a web services interface, via which a service customer 1150 may access functionality provided by the hardware virtualization service 1120, for example via a console 1194. In at least some embodiments, at the service provider 1100, each virtual computing system 1192 at customer 1150 may correspond to a computation resource 1124 that is leased, rented, or otherwise provided to service customer 1150.

From an instance of a virtual computing system 1192 and/or another customer device 1190 or console 1194, the customer may access the functionality of storage virtualization service 1110, for example via one or more APIs 1102, to access data from and store data to a virtual data store 1116 provided by the service provider 1100. In some embodiments, a virtualized data store gateway (not shown) may be provided at the service customer 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another customer device 1190, may mount and access virtual data store 1116 volumes, which appear to the user as local virtualized storage 1198.

While not shown in FIG. 11, the virtualization service(s) may also be accessed from resource instances within the service provider 1100 network via API(s) 1102. For example, a customer, appliance service provider, or other entity may access a virtualization service from within a respective private network on the service provider 1100 network via an API 1102 to request allocation of one or more resource instances within the private network or within another private network.

Figure 12:
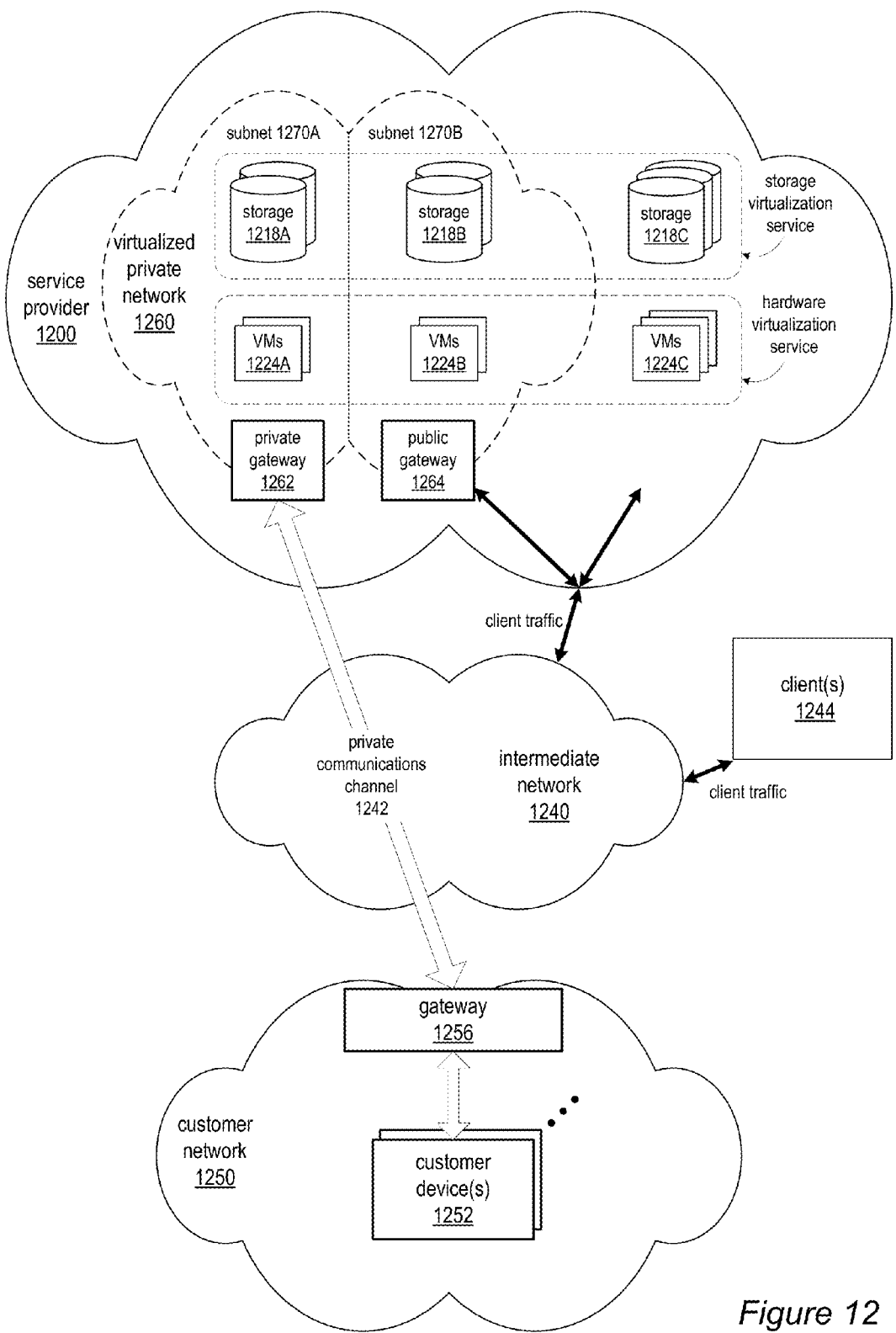
FIG. 12 illustrates an example service provider that provides private networks on the service provider network to at least some customers, according to at least some embodiments.

FIG. 12 illustrates an example service provider that provides private networks on the service provider network to at least some customers, according to at least some embodiments. A customer's virtualized private network 1260 on a service provider 1200 network, for example, enables a customer to connect their existing infrastructure (e.g., devices 1252) on customer network 1250 to a set of logically isolated service provider resource instances (e.g., VMs 1224A and 1224B and storage 1218A and 1218B), and to extend management capabilities such as security services, firewalls, and intrusion detection systems to include their service provider resource instances.

A customer's virtualized private network 1260 may be connected to a customer network 1250 via a private communications channel 1242. A private communications channel 1242 may, for example, be a tunnel implemented according to a network tunneling technology or some other peering connection over an intermediate network 1240. The intermediate network may, for example, be a shared network or a public network such as the Internet. Alternatively, a private communications channel 1242 may be implemented over a direct, dedicated connection between virtualized private network 1260 and customer network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a customer network.

To establish a virtualized private network 1260 for a customer on service provider 1200 network, one or more resource instances (e.g., VMs 1224A and 1224B and storage 1218A and 1218B) may be allocated to the virtualized private network 1260. Note that other resource instances (e.g., storage 1218C and VMs 1224C) may remain available on the service provider 1200 network for other customer usage. A range of public IP addresses may also be allocated to the virtualized private network 1260. In addition, one or more networking devices (routers, switches, etc.) of the service provider 1200 network may be allocated to the virtualized private network 1260. A private communications channel 1242 may be established between a private gateway 1262 at virtualized private network 1260 and a gateway 1256 at customer network 1250.

In at least some embodiments, in addition to, or instead of, a private gateway 1262, virtualized private network 1260 may include a public gateway 1264 that enables resources within virtualized private network 1260 to communicate directly with entities (e.g., client 1244) via intermediate network 1240, and vice versa, instead of or in addition to via private communications channel 1242.

Virtualized private network 1260 may be, but is not necessarily, subdivided into two or more subnets 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The customer may assign particular customer public IP addresses to particular resource instances in virtualized private network 1260. A client 1244 on intermediate network 1240 may then send traffic to a public IP address published by the customer; the traffic is routed, by the service provider 1200, to the associated resource instance. Return traffic from the resource instance is routed, by the service provider 1200, back to the client 1244 over intermediate network 1240. Note that routing traffic between a resource instance and a client 1244 may require network address translation to translate between the public IP address and the private IP address of the resource instance.

At least some embodiments may allow a customer to remap public IP addresses in a customer's virtualized private network 1260 as illustrated in FIG. 12 to devices on the customer's external network 1250. When a packet is received from a client (e.g., client 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the client through the provider network 1200, or alternatively may be directly routed to the client by the customer network 1250. From the perspective of the client, it appears as if the client is communicating with the public IP address of the customer on the provider network 1200. However, the client has actually communicated with the endpoint on customer network 1250.

While FIG. 12 shows client 1244 as a client on intermediate network 1240 and external to service provider 1200 network, a client may be an entity on service provider 1200 network. For example, one of the resource instances provided by the service provider 1200 may be a client that sends traffic to a public IP address published by the customer.

Service Private Instances

In service provider network environments such as those illustrated in FIGS. 9 through 12, the customers' virtualized resources provided through the virtualization services may generally be implemented on multi-tenant devices. For example, in a hardware virtualization service, a single physical computing machine may be shared among multiple customers by providing each customer with one or more virtual machines hosted by the single physical computing machine. As another example, in a storage virtualization service, each customer's virtualized data store may be distributed across multiple data storage devices, with a given storage device storing portions of data for two or more customers. However, at least some customers of a service provider may desire or require some degree of isolation of the customers' data and/or processes on a service provider network. Thus, in at least some embodiments, the service provider may allow a customer to request the establishment of a private implementation of a service (e.g., a hardware virtualization service or a storage virtualization service). In response to the request, a service private instance may be automatically and/or manually established for the customer to the service and that is at least in part implemented on single-tenant hardware that is not shared with other customers. In addition, a private API endpoint may be provided for the service private instance. While the service private instance may conform to the same service API as the service public instance, the service private instance may at least initially be implemented differently than the multi-tenant service public instance, for example as a relatively small scale and possibly limited implementation of the service when compared to the multi-tenant service public instance. As the needs of the customer grow, the service private instance may be automatically and/or manually scaled up from the initial implementation. The service private instance may also be scaled down if the needs of the customer decrease. The scaling up or down of the service private instance may be performed transparently from the customer's perspective.

Illustrative System

Figure 13:
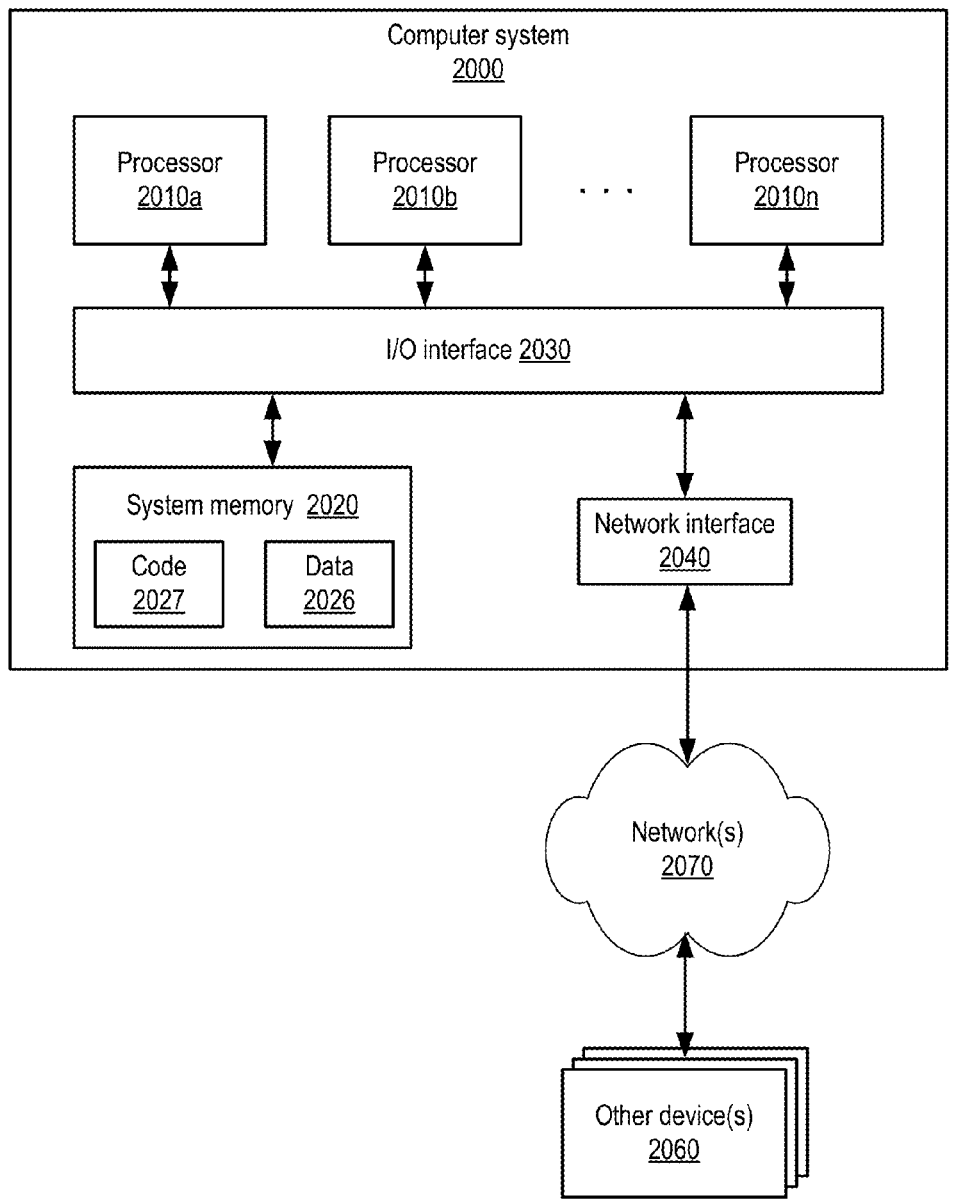
FIG. 13 is a block diagram illustrating an example computer system that may be used in some embodiments.

In at least some embodiments, a server that implements a portion or all of one or more of the technologies, including but not limited to the various service provider methods and apparatus and the methods and apparatus for providing composed appliance services in service provider networking environments as described herein, may include a general-purpose computer system that includes or is configured to access one or more computer-accessible media, such as computer system 2000 illustrated in FIG. 13. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for service provider methods and apparatus and the methods and apparatus for providing composed appliance services in service provider networking environments, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 12, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 12 for implementing embodiments of service provider methods and apparatus and the methods and apparatus for providing composed appliance services in service provider networking environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
provisioning, on a provider network, an instance of an appliance service comprising at least one front-end node and one or more backend nodes, wherein subsets of a plurality of resource instances on the provider network are allocated to customers of the provider network as customer resource instances, and wherein said provisioning comprises:
provisioning, in a customer subnet on the provider network, a resource instance as a front-end node instance of the appliance service instance, wherein the customer subnet includes one or more components of the provider network allocated to a specific customer of the provider network;
provisioning, in a backend subnet on the provider network, one or more resource instances as backend node instances of the appliance service instance, wherein the backend subnet on the provider network is distinct from the customer subnet for the specific customer, and wherein the one or more resource instances provisioned as backend node instances are allocated to a provider of the appliance service separate from the specific customer;
wherein said provisioning the resource instance as the front-end node instance of the appliance service instance comprises provisioning the front-end node instance with at least two interfaces, wherein one interface of the at least two interfaces is provisioned in the customer subnet and is configured to send and receive communications from the customer subnet to the appliance service instance, and wherein another of the at least two interfaces is provisioned in the backend subnet outside the customer subnet and is configured to send and receive communications between the front-end node instance and the one or more backend node instances of the appliance service instance; and
wherein at least one of the one or more backend node instances of the appliance service instance is configured to communicate with one or more other front-end node instances of another customer subnet for another customer, wherein the other customer subnet is distinct from the customer subnet for the specific customer.

2. The method as recited in claim 1, wherein a third interface of the at least two interfaces of the front-end node instance is provisioned in a third subnet on the provider network, wherein the third interface is configured to send and receive communications for monitoring and managing the front-end node instance from the third subnet.

3. The method as recited in claim 1, wherein said provisioning the instance of the appliance service further comprises provisioning, in each of at least one other backend subnet on the provider network, one or more additional resource instances as backend node instances of the appliance service instance, wherein the at least two interfaces of the front-end node instance include an interface in each of the at least one other backend subnets for communications between the front-end node instance and the one or more backend node instances in the respective backend subnet.

4. The method as recited in claim 1, wherein backend nodes of the appliance service access another appliance service, and wherein said provisioning the instance of the appliance service further comprises:
provisioning, in the backend subnet, a resource instance as a front-end node instance of an instance of the other appliance service on the provider network;
provisioning, in another backend subnet on the provider network, one or more resource instances as backend node instances of the instance of the other appliance service;
wherein the front-end node instance of the instance of the other appliance service includes at least two interfaces, wherein one interface of the at least two interfaces is in the backend subnet for communications between the backend node instances of the appliance service in the backend subnet and the front-end node instance of the instance of the other appliance service, and wherein another of the at least two interfaces is in the other backend subnet for communications between the front-end node instance of the instance of the other appliance service and the one or more backend node instances of the instance of the other appliance service.

5. The method as recited in claim 1, wherein said provisioning the resource instance as the front-end node instance of the appliance service instance is performed by a first entity on the provider network that provisions front-end node instances for the appliance service, and wherein said provisioning the one or more resource instances as the backend node instances of the appliance service instance is performed by a second entity on the provider network that provisions backend node instances for the appliance service.

6. The method as recited in claim 1, wherein the appliance service instance is provided to the specific customer by an appliance service provider, and wherein the resource instances in the appliance service instance are provided by an entity that operates the provider network.

7. The method as recited in claim 6, further comprising the appliance service provider charging the specific customer for usage of the appliance service instance, and the entity that operates the provider network charging the appliance service provider for usage of the resource instances in the appliance service instance.

8. The method as recited in claim 6, further comprising the entity that operates the provider network charging the specific customer for usage of the appliance service instance, wherein the entity that operates the provider network pays the appliance service provider for usage of the appliance service instance by the specific customer and charges the appliance service provider for usage of the resource instances in the appliance service instance.

9. A provider network, comprising:
a plurality of devices that implement a plurality of resource instances, wherein the provider network includes subsets of the plurality of resource instances allocated to customers of the provider network as customer resource instances;
at least two subnets, wherein the at least two subnets include a customer subnet that includes one or more components of the provider network allocated to a specific customer of the provider network, and a backend subnet, wherein the backend subnet on the provider network is distinct from the customer subnet for the specific customer; and
an instance of an appliance service comprising at least one front-end node and one or more backend nodes, wherein the appliance service instance comprises a resource instance provisioned in the customer subnet as a front-end node instance of the appliance service instance and one or more resource instances provisioned in the backend subnet as backend node instances of the appliance service instance, wherein the one or more resource instances provisioned as backend node instances are allocated to a provider of the appliance service separate from the specific customer;
wherein the front-end node instance includes at least two interfaces, wherein one interface of the at least two interfaces is in the customer subnet and is operable to transmit and receive communications from the customer subnet to the appliance service instance, and wherein another of the at least two interfaces is in the backend subnet outside the customer subnet and is operable to transmit and receive communications between the front-end node instance and the one or more backend node instances of the appliance service instance; and
wherein at least one of the one or more backend node instances of the appliance service instance is configured to communicate with one or more other front-end node instances of another customer subnet for another customer, wherein the other customer subnet is distinct from the customer subnet for the specific customer.

10. The provider network as recited in claim 9, wherein the backend subnet is operated by an entity that provides the appliance service.

11. The provider network as recited in claim 9, wherein the at least two subnets include a third subnet, and wherein a third interface of the at least two interfaces of the front-end node instance is in the third subnet and is operable to transmit and receive communications for monitoring and managing operations of the front-end node instance from the third subnet.

12. The provider network as recited in claim 11, wherein an entity that provisions front-end node instances of the appliance service is different than an entity that provisions backend node instances of the appliance service, wherein the backend subnet is operated by the entity that provisions the backend node instances, and wherein the third subnet is operated by the entity that provisions the front-end node instances.

13. The provider network as recited in claim 9, wherein the at least two subnets further include at least one other backend subnet, wherein the appliance service instance further comprises one or more resource instances in each of the one or more other backend subnets provisioned as backend node instances of the appliance service instance, and wherein the at least two interfaces of the front-end node instance include an interface in each of the at least one other backend subnets for communications between the front-end node instance and the one or more backend node instances in the respective backend subnet.

14. The provider network as recited in claim 9, wherein backend nodes of the appliance service access another appliance service, wherein the backend subnet includes a resource instance provisioned as a front-end node instance of an instance of the other appliance service, and wherein the at least two subnets include another backend subnet that includes one or more resource instances provisioned as backend node instances of the instance of the other appliance service.

15. The provider network as recited in claim 14, wherein the front-end node instance of the instance of the other appliance service includes at least two interfaces, wherein one interface of the at least two interfaces is in the backend subnet for communications between the backend node instances of the appliance service in the backend subnet and the front-end node instance of the instance of the other appliance service, and wherein another of the at least two interfaces is in the other backend subnet for communications between the front-end node instance of the instance of the other appliance service and the one or more backend node instances of the instance of the other appliance service.

16. The provider network as recited in claim 9, wherein the customer subnet is one of one or more subnets in a virtual private network on the provider network operated by the specific customer, and wherein the backend subnet is one of one or more subnets in a different virtual private network on the provider network operated by an entity that provides the appliance service.

17. The provider network as recited in claim 9, wherein the customer subnet is one of two or more subnets in a virtual private network on the provider network, and wherein the backend subnet is a different one of the two or more subnets in the same virtual private network.

18. The provider network as recited in claim 9, wherein each backend node instance includes at least two interfaces, wherein one interface of the at least two interfaces is in the backend subnet and is operable to transmit and receive communications between the front-end node instance and the backend node instance, and wherein another of the at least two interfaces is in a management subnet and is operable to transmit and receive communications for monitoring and managing operations of the backend node instance from the management subnet.

19. A non-transitory computer-accessible storage medium storing program instructions computer-executable to implement:
  provisioning, in a subnet on a provider network, at least one resource instance as a front-end node instance of an appliance service instance, wherein the subnet includes one or more components of the provider network allocated to a specific entity that operates the subnet;
  provisioning, in each of one or more other subnets on the provider network, one or more resource instances as backend node instances of the appliance service instance, wherein each of one or more other subnets on the provider network are distinct from the subnet for the specific entity, and wherein the one or more resource instances provisioned as backend node instances are allocated to a provider of the appliance service separate from the specific entity;
  provisioning each of the at least one front-end node instances with at least two interfaces, wherein one interface is provisioned in the subnet of the specific entity and is configured to send and receive communications from the subnet of the specific entity to the appliance service instance, and wherein one or more others of the interfaces each is provisioned in one of the one or more other subnets distinct from the subnet for the specific entity and is configured to send and receive communications between the respective front-end node instance and one or more backend node instances of the appliance service instance in the respective subnet; and
  wherein at least one of the one or more backend node instances of the appliance service instance is configured to communicate with one or more additional front-end node instances of an additional subnet for an additional customer, wherein the additional subnet is distinct from the subnet for the specific entity.

20. The non-transitory computer-accessible storage medium as recited in claim 19, wherein the program instructions are further computer-executable to implement provisioning each of the at least one front-end node instances with a management interface that faces a management subnet on the provider network, wherein the third interface is configured to send and receive communications for monitoring and managing operations of the respective front-end node instance from the management subnet.

21. The non-transitory computer-accessible storage medium as recited in claim 20, wherein an entity that provides front-end node instances of the appliance service is different than an entity that provides backend node instances of the appliance service.

22. The non-transitory computer-accessible storage medium as recited in claim 21, wherein, in said provisioning at least one resource instance as a front-end node instance, the program instructions are computer-executable to implement requesting the entity that provides front-end node instances of the appliance service to provision the at least one front-end node instance in the subnet of the specific entity.

23. The non-transitory computer-accessible storage medium as recited in claim 20, wherein the one or more other subnets are operated by the entity that provisions the backend node instances, and wherein the management subnet is operated by the entity that provisions the front-end node instances, wherein the entity that operates the management subnet is separate from the entity that provisions the backend node instances.

24. The non-transitory computer-accessible storage medium as recited in claim 19, wherein the specific entity is a customer of the provider network, and wherein the provider network includes subsets of the plurality of resource instances allocated to customers of the provider network as customer resource instances.

25. The non-transitory computer-accessible storage medium as recited in claim 19, wherein said provisioning at least one resource instance as a front-end node instance of an appliance service instance, said provisioning one or more resource instances as backend node instances of the appliance service instance, and said provisioning each of the at least one front-end node instances with at least two interfaces is performed in response to a request by the specific entity to a provider of the appliance service to provision an instance of the appliance service in the subnet operated by the entity.

26. The non-transitory computer-accessible storage medium as recited in claim 19, wherein the program instructions are further computer-executable to implement provisioning each backend node instance with at least two interfaces, wherein one interface of the at least two interfaces faces the backend subnet and is configured to send and receive communications between the front-end node instance and the backend node instance, and wherein another of the at least two interfaces is in a management subnet and is configured to send and receive communications for monitoring and managing operations of the backend node instance from the management subnet.

27. The non-transitory computer-accessible storage medium as recited in claim 19, wherein said provisioning the at least one resource instance as the front-end node instance of the appliance service instance and said provisioning the one or more resource instances as the backend node instances of the appliance service instance are performed in response to calls to at least one application programming interface (API) requesting said provisioning.

28. The non-transitory computer-accessible storage medium as recited in claim 19, wherein said provisioning the at least one resource instance as the front-end node instance of the appliance service instance is performed by a first entity on the provider network that provisions front-end node instances for the appliance service in response to a call to an application programming interface (API) to the first entity, and wherein said provisioning the one or more resource instances as the backend node instances of the appliance service instance is performed by a second entity on the provider network that provisions backend node instances for the appliance service in response to a call to an API to the second entity.

29. A device, comprising:
   at least one processor; and
   a memory comprising program instructions, wherein the program instructions are executable by the at least one processor to implement:
      a front-end node instance of an appliance service instance on a customer subnet on a provider network, wherein the customer subnet is for a specific customer,
      wherein backend node instances of the appliance service instance are in one or more other subnets of the provider network, and wherein the one or more other subnets on the provider network are distinct from the customer subnet, and wherein the backend node instances are allocated to a provider of the appliance service separate from the specific customer and separate from an operator of the provider network;
      wherein the front-end node instance implements at least two interfaces, wherein one interface is provisioned in the customer subnet and is operable to transmit and receive communications from the customer subnet to the appliance service instance, and wherein one or more others of the interfaces each are provisioned in one of the one or more other subnets distinct from the customer subnet and is operable to transmit and receive communications between the front-end node instance and one or more backend node instances of the appliance service instance in the respective subnet; and
      wherein at least one of the one or more backend node instances of the appliance service instance is configured to communicate with one or more additional front-end node instances of an additional customer subnet for an additional customer, wherein the additional customer subnet is distinct from the customer subnet for the specific customer.

30. The device as recited in claim 29, wherein the at least two interfaces of the front-end node instance include an interface that faces a management subnet on the provider network and that is operable to transmit and receive communications for monitoring and managing operations of the front-end node instance from the management subnet.

\* \* \* \* \*